US009577563B2

(12) United States Patent
Roesner

(10) Patent No.: US 9,577,563 B2
(45) Date of Patent: Feb. 21, 2017

(54) METHOD FOR ACTIVATING AN ELECTRIC MACHINE

(71) Applicant: Robert Bosch GmbH, Stuttgart (DE)

(72) Inventor: Julian Roesner, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 135 days.

(21) Appl. No.: 14/543,572

(22) Filed: Nov. 17, 2014

(65) Prior Publication Data

US 2015/0137716 A1    May 21, 2015

(30) Foreign Application Priority Data

Nov. 20, 2013  (DE) .................. 10 2013 223 624

(51) Int. Cl.
*H02P 1/16* (2006.01)
*H02P 6/20* (2016.01)
*H02P 25/22* (2006.01)

(52) U.S. Cl.
CPC .............. *H02P 25/22* (2013.01); *H02P 6/15* (2016.02)

(58) Field of Classification Search
CPC .............. H02P 1/16; H02P 1/18; H02P 1/46; H02P 6/20; H02P 1/02; H02P 25/14
USPC ............. 318/272, 430, 431, 436, 400.01, 400.11, 318/400.26
See application file for complete search history.

(56) References Cited

U.S. PATENT DOCUMENTS 6,150,788 A * 11/2000 Someya ............... H02P 8/12
                                                   318/135
6,628,099 B2 * 9/2003 Iwaji ................. H02P 6/001
                                                   318/432

FOREIGN PATENT DOCUMENTS

DE         10036099      2/2002
DE         10346060      5/2005
DE         102011076667  12/2012
DE         102011078841  1/2013

* cited by examiner

*Primary Examiner* — Bentsu Ro
(74) *Attorney, Agent, or Firm* — Gerard Messina

(57) ABSTRACT

In a method for activating an electric machine having a rotor, a stator winding having multiple phases and a rectifier having multiple half-bridges corresponding to the number of phases, which each have active switching elements, alternating current signals, which are phase-offset to one another by switching the switching elements, are applied to the phases in a first motor operating mode in which the rotor rotates above a limiting speed, and in a second motor operating mode, in which the rotor rotates below the limiting speed, constant direct-current signals are at least partially applied to the phases by switching the switching elements as a function of an instantaneous angle position of the rotor, the direct-current signals being selected in such a way that a current flow does not exceed a predefined maximum current absolute value through any of the phases.

18 Claims, 10 Drawing Sheets

| Phi | A | B | C | D | E |
|---|---|---|---|---|---|
| 0 | 1 | 0.5 | 0 | -0.5 | -1 |
| 36 | 0.5 | 1 | -1 | -0.5 | 0 |
| 72 | 0.5 | 0 | -0.5 | -1 | 1 |
| 108 | 1 | -1 | -0.5 | 0 | 0.5 |
| 144 | 0 | -0.5 | -1 | 1 | 0.5 |
| 180 | -1 | -1 | 0 | 0.5 | 1 |
| 216 | -0.5 | 0 | 1 | 0.5 | 0 |
| 252 | -0.5 | 1 | 0.5 | 1 | -1 |
| 288 | -1 | 0.5 | 0.5 | 0 | -0.5 |
| 324 | 0 | 0.5 | 1 | -1 | -0.5 |

METHOD FOR ACTIVATING AN ELECTRIC MACHINE

BACKGROUND OF THE INVENTION

1. Field of the Invention

The present invention relates to a device and a method for activating an electric machine.

2. Description of the Related Art

Generators for converting mechanical energy into electrical energy in motor vehicles are known. Claw pole generators are usually used for this purpose. According to the related art, these are usually equipped with electrical excitation. Since claw pole generators generate polyphase current, for example, three-phase or five-phase current, rectifying is required for the typical DC voltage vehicle electrical systems of motor vehicles. The related art includes rectifiers based on semiconductor diodes or active rectifiers.

Generators which may also be used for starting the internal combustion engine are known ("starter generator", RSG). Such a starter generator is typically only operated as a motor at very low speeds, since the torque which may be generated decreases rapidly in the direction of increasing speeds.

Corresponding generators are known, for example, from the field of hybrid vehicles. The goal in this case is to assist the internal combustion engine at low speeds, at which it does not yet deliver its full torque (boost operation, turbo lag compensation).

To be able to provide the required power, such drives are typically operated at a voltage (for example, 48 V) which is significantly higher than the vehicle electrical system voltage (for example, 12 V) provided as standard in the vehicle. Vehicle electrical systems which include two or more voltage levels (for example, 12 V and 48 V) for this and other reasons are also referred to as "two-voltage vehicle electrical systems" or "multi-voltage vehicle electrical systems."

Terms such as "electric machine," (electric) drive," and "electric motor" are used synonymously hereafter. In each case, these are electric machines which may be operated at least sometimes as motors, optionally also as generators, and whose stator winding is commutated via a rectifier using currents (phase currents) according to a predefined activation pattern. A "stator winding" is understood as a system made up of multiple electrical coils. Such a stator winding is designed in the electric machine considered in the present case as a multiphase winding. In this multiphase winding, electrical coils are interconnected individually or in groups in the form of a star or triangle, for example. The number of the coils or also the number of multiple groups of identically connected coils corresponds to the phase number of the electric machine.

From a thermal aspect, the mentioned low speeds and in particular the standstill of the electric machine are particularly critical if the stator winding is further energized in this case. Since the phase currents only change slowly at low speeds and therefore possibly will still be at high levels for a longer time and even have constant values at a standstill, destruction of the activation electronics due to overheating may occur here in a short time.

However, it must be ensured at the same time that the electric machine may also generate a preferably high torque rapidly from a standstill, for example, to implement an electrical startup of the vehicle. A complete interruption of the current feed is therefore not desirable.

The present invention will provide a remedy here and improve the activation of a corresponding electric machine, in particular at a standstill.

BRIEF SUMMARY OF THE INVENTION

The present invention is directed to a method known per se for activating an electric machine which may be operated at least as a motor in the above meaning. Such a machine includes a rotor, a stator winding having a number of phases, and a rectifier having a number of half-bridges corresponding to the number of phases, which each have two active switch elements situated in a series connection between two DC voltage terminals of the rectifier. The mentioned phases are connected between these switching elements, for example MOSFETs, which are situated in a series connection. A corresponding terminal point is also referred to as a "center tap" of the half-bridges. As is known in this regard, in a first motor operating mode, in which the rotor rotates above a limiting speed, alternating current signals, which are phase-offset to one another, are applied to the phases by switching the switching elements, the frequency of the signals being set as a function of the speed.

An essential aspect of the present invention is the use of two different operating modes, of which a first operating mode is predominantly or exclusively used in the case of a (rapidly) rotating rotor and the second operating mode is predominantly or exclusively used in the case of a slowly rotating or stationary rotor. The first operating mode includes an activation of the phases using alternating current signals, which are phase-offset to one another; the second operating mode includes an activation of at least some of the phases using direct current signals, as explained hereafter.

The "limiting speed," which is employed as a criterion as to whether the first or the second operating mode is used, may be a speed threshold value stored in a control unit, which is optionally also variable. However, it is also possible to already use the first operating mode when the rotor rotates at a minimum speed not equal to zero. In this case, the minimum speed not equal to zero is the limiting speed, below which the rotor no longer rotates, however, but rather is stationary.

When the rotor rotates precisely at the limiting speed (in practice this occurs only very briefly during the increase or decrease of the speed), either the first or the second operating mode may be used, a differentiation also being able to be made between an increase and a decrease of the speed. During the increase of the speed, when the rotor reaches the limiting speed, the second operating mode may still be used or the first operating mode may already be used. During the decrease of the speed, when the rotor reaches the limiting speed independently of the increase of the speed, the first operating mode may still be used or the second operating mode may already be used.

Since the second operating mode is less suitable for a rotating electric machine, when the rotor is set into rotation, it is advantageously switched over to the first operating mode. The method according to the present invention does not necessarily have to include switching over from the second operating mode into the first operating mode immediately when a corresponding electric machine is set into motion. This may also first be carried out above a limiting speed, which is significantly different from zero in this case, under which the disadvantages possibly caused by the second operating mode still do not display large effects.

The above-mentioned second operating mode is carried out when the rotor is stationary or rotates below the mentioned limiting speed. In this second operating mode, constant direct current signals are at least partially applied to the phases of the stator winding by switching the switching elements as a function of an instantaneous angle position of the rotor. In this regard, as explained hereafter, this operating mode may still correspond to known operating modes, specifically when a corresponding conventional commutation merges into corresponding constant direct current signals by reducing the frequency. As explained hereafter, these conventional direct current signals also have the result, however, that the switching elements or the activation circuits thereof are thermally loaded very differently and therefore may also fail.

According to the present invention, in contrast, it is provided that in the second operating mode, in which the rotor is stationary or rotates below the limiting speed, the direct current signals are selected in such a way that a current flow does not exceed a predefined maximum current absolute value through any of the phases and an absolute value of a space vector in a d/q coordinate system defined by the phases on the basis of the current flows is greater than this maximum current absolute value. In a conventional activation method, as specified below, the absolute value of the space vector in a d/q coordinate system defined by the phases on the basis of the current flows is essentially as large as the maximum current absolute value, specifically an amplitude of a corresponding, for example, sinusoidal current signal.

The definition of a corresponding space vector in a d/q coordinate system, Idq, is generally known and takes place via a Clarke and Park transformation. Clarke transformation (α/β transformation) combines the phase dimensions to form a space vector which rotates at the electrical frequency; Park transformation (d/q transformation) transforms this space vector into a rotating-field-fixed d,q coordinate system. The absolute value of a corresponding space vector is identified with |Idq|. By way of these transformations, multi-phase dimensions having corresponding axes, in five-phase machines, for example, axes A through E or U through Y, are converted into a two-phase coordinate system having axes d and q. Corresponding methods are part of the mathematical foundation for vector control of polyphase machines and are known to those skilled in the art in this regard. A corresponding d/q coordinate system rotates with the rotor in the stationary case and value pair d/q represents chronologically constant dimensions.

If the present method is used in an electric machine having five phases, which are activated via a rectifier having five half-bridges, advantageously, a positive voltage signal having a first absolute value is output via a first of the five half-bridges, a negative voltage signal having the first absolute value is output via a second of the five half-bridges, a positive voltage signal having half of the first absolute value is output via a third of the five half-bridges, a negative voltage signal having half of the first absolute value is output via a fourth of the five half-bridges, and no voltage signal is output to the phases via a fifth of the five half-bridges, as will also be explained hereafter, in particular with reference to FIGS. 6 and 7.

However, the present invention is also suitable in a corresponding way for machines having other phase numbers, for example, four-phase, six-phase, seven-phase, eight-phase, nine-phase, and multiphase electric machines.

An electric machine, which is also provided according to the present invention, according to the corresponding independent patent claim includes all means which enable implementation of the method according to the present invention.

In particular, such an electric machine also includes a control unit, which is configured for the purpose of applying alternating current signals, which are phase-offset to one another by switching the switching elements, to the phases in a first motor operating mode in which the rotor rotates at or above a limiting speed, the frequency of the signals being speed-dependently set. Furthermore, the control unit is configured according to the present invention for the purpose of at least partially applying constant direct current signals to the phases by switching the switching elements as a function of an instantaneous angle position of the rotor in a second motor operating mode, in which the rotor is stationary or rotates below the limiting speed, the direct current signals being selected in such a way that a current flow does not exceed a predefined maximum current absolute value through any of the phases and an absolute value of a space vector in a d/q coordinate system, which is defined on the basis of the current flows through the phases, is greater than the maximum current absolute value.

A processing unit according to the present invention, for example, a control unit of a motor vehicle, is configured, in particular by programming, to carry out the method according to the present invention.

The implementation of the method in the form of software is also advantageous, since this involves particularly low costs, in particular if an executing control unit is also used for further tasks and is therefore present in any case. Suitable data media for providing the computer program are in particular diskettes, hard drives, flash memories, EEPROMs, CD-ROMs, DVDs, etc. A download of a program via computer networks (Internet, Intranet, etc.) is also possible.

Further advantages and embodiments of the present invention result from the description and the appended drawings.

It is understood that the above-mentioned features and the features to be explained hereafter are usable not only in the particular specified combination, but rather also in other combinations or alone, without departing from the scope of the present invention.

The present invention is schematically shown in the drawings on the basis of exemplary embodiments and will be described in greater detail hereafter with reference to the drawings.

DETAILED DESCRIPTION OF THE INVENTION

Figure 1:
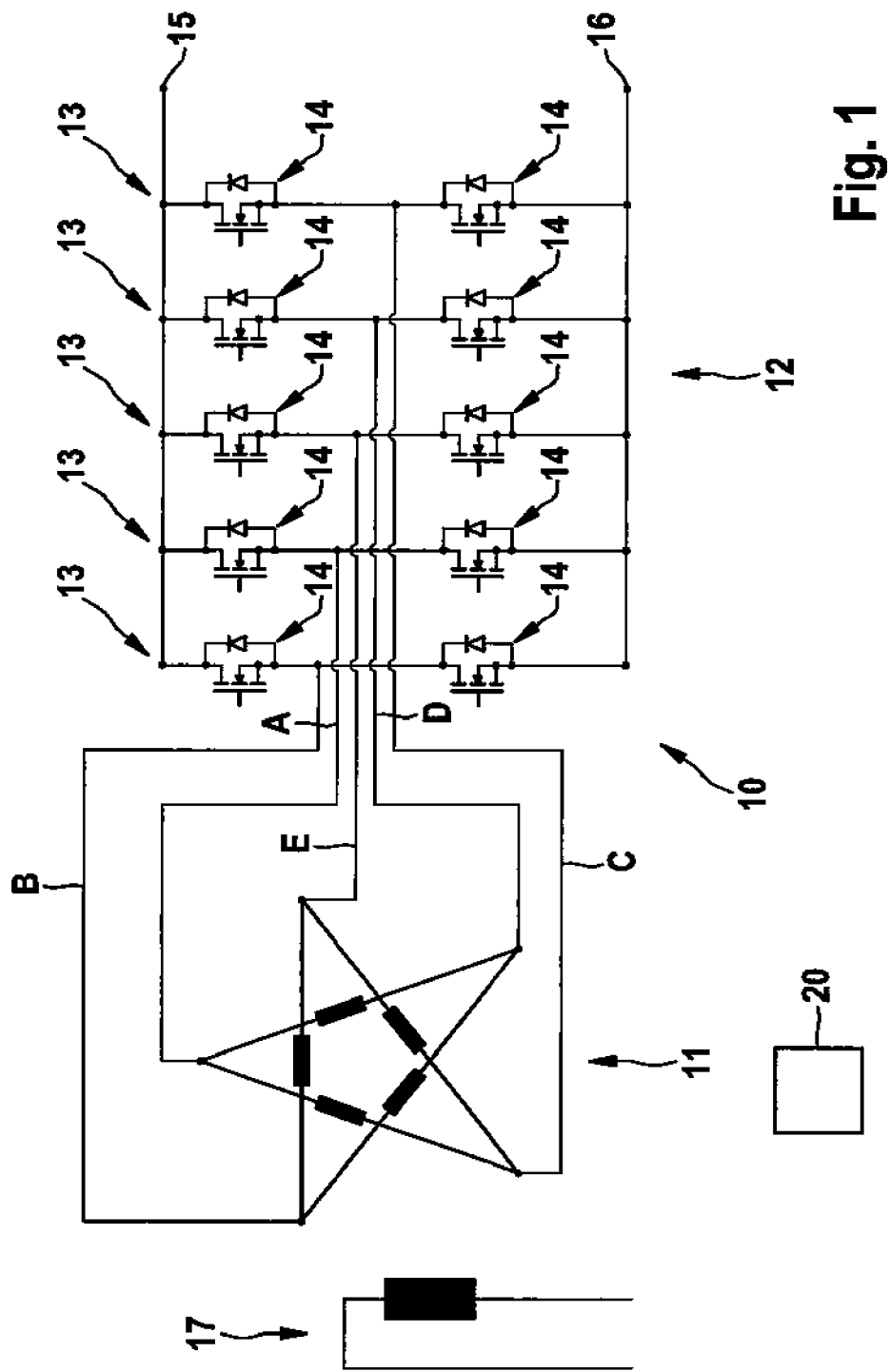
FIG. 1 shows a five-phase electric machine, which may be activated according to the present invention, in a schematic partial view.

Elements corresponding to one another are specified with identical reference numerals in the figures. A repeated explanation will be omitted for the sake of clarity.

FIG. 1 shows a five-phase electric machine, as may be used within the scope of the present invention, in a schematic partial view. The electric machine is identified as a whole with reference numeral 10. FIG. 1 shows only a stator winding 11 implemented in the form of a five-phase star circuit. A rotor 17 is only partially schematically illustrated in the form of an exciter winding. A control unit, which is configured to activate five-phase electric machine 10, is heavily schematically illustrated and is identified as a whole with reference numeral 20. Control unit 20 is designed for the purpose of outputting activation signals to active switching elements 14, so that corresponding current or voltage signals are output to phases A through E of stator winding 11.

A rectifier 12, which has a number of half-bridges 13 corresponding to the phase number of the electric machine, is assigned for the commutation of the stator winding 11. In each case active switching elements 14, for example, MOSFETs, are connected in series in half-bridges 13. The ends of half-bridges 13 are connected to positive and negative voltage terminals 15 and 16, for example, the corresponding poles of a vehicle battery. The term "rectifier branch" summarizes the halves of particular half-bridges 13, which are each connected directly to one of voltage terminals 15 and 16. A "top" or "positive" rectifier branch ("high side") includes all switching elements 14 which are each incorporated between the center taps of half-bridges 13 and positive voltage terminal 15; a "bottom" or "negative" rectifier branch ("low side"), in contrast, includes all switching elements 14 which are each incorporated between the center taps of half-bridges 13 and negative voltage terminal 16.

The center taps of half-bridges 13 (without reference numeral) are connected to phases A through E of stator winding 11, which are identified here counterclockwise with the mentioned capital letters. By way of a suitable activation, i.e., an application of current using corresponding currents via rectifier 12, as explained hereafter with reference to FIG. 2, corresponding phase currents result in individual phases A through E, which are identified hereafter with I_A through I_E (or $I_A$ through $I_E$).

In particular, it is to be noted that DC voltage terminals 15 and 16 are typically connected to a voltage source which supplies a higher voltage (for example, 48 V) than a typical vehicle electrical system voltage (for example, 12 V). Switching elements 14 are turned on and off on the basis of a suitable activation signal, so that corresponding phase currents I_A through I_E are generated in phases A through E, as mentioned, the frequency of which is set proportionally to the speed of electric machine 10. The phase currents are typically sinusoidal.

Figure 2:
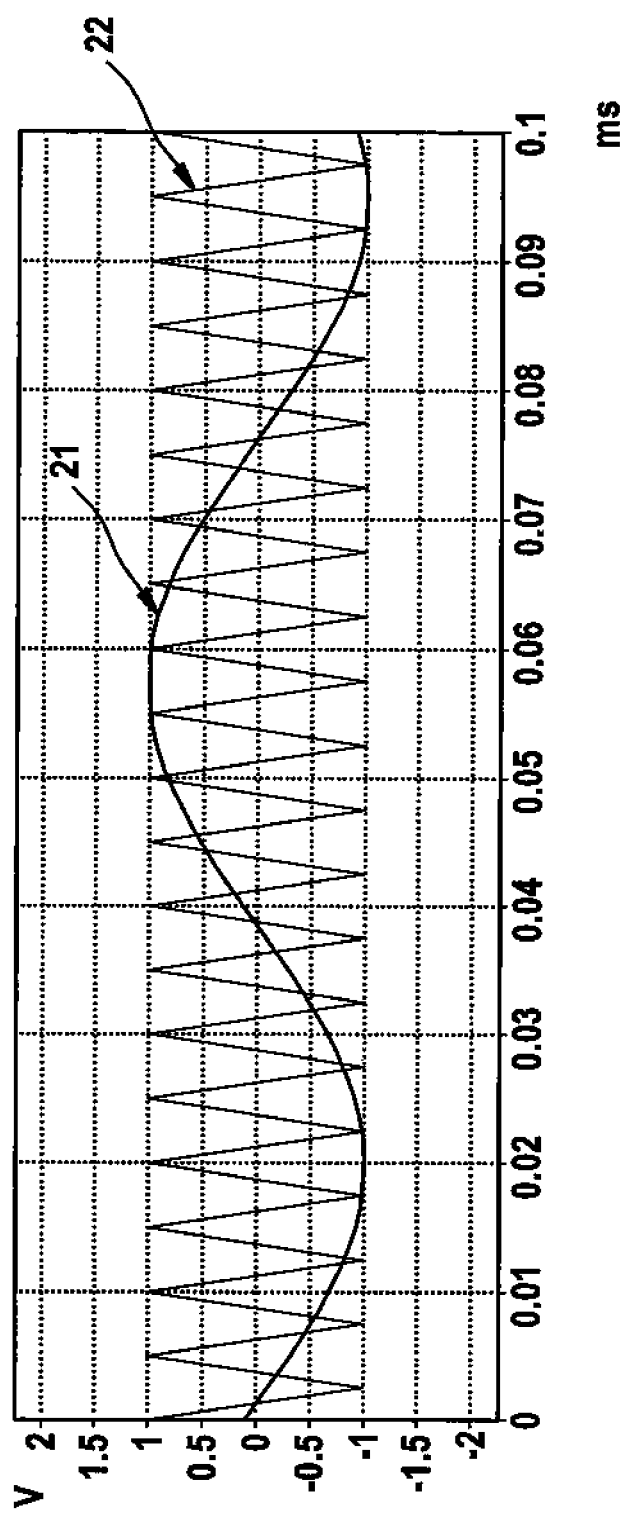
FIG. 2A illustrates a method for activating an electric machine according to the related art.
FIG. 2B illustrates another method for activating an electric machine according to the related art.
Figure 2:
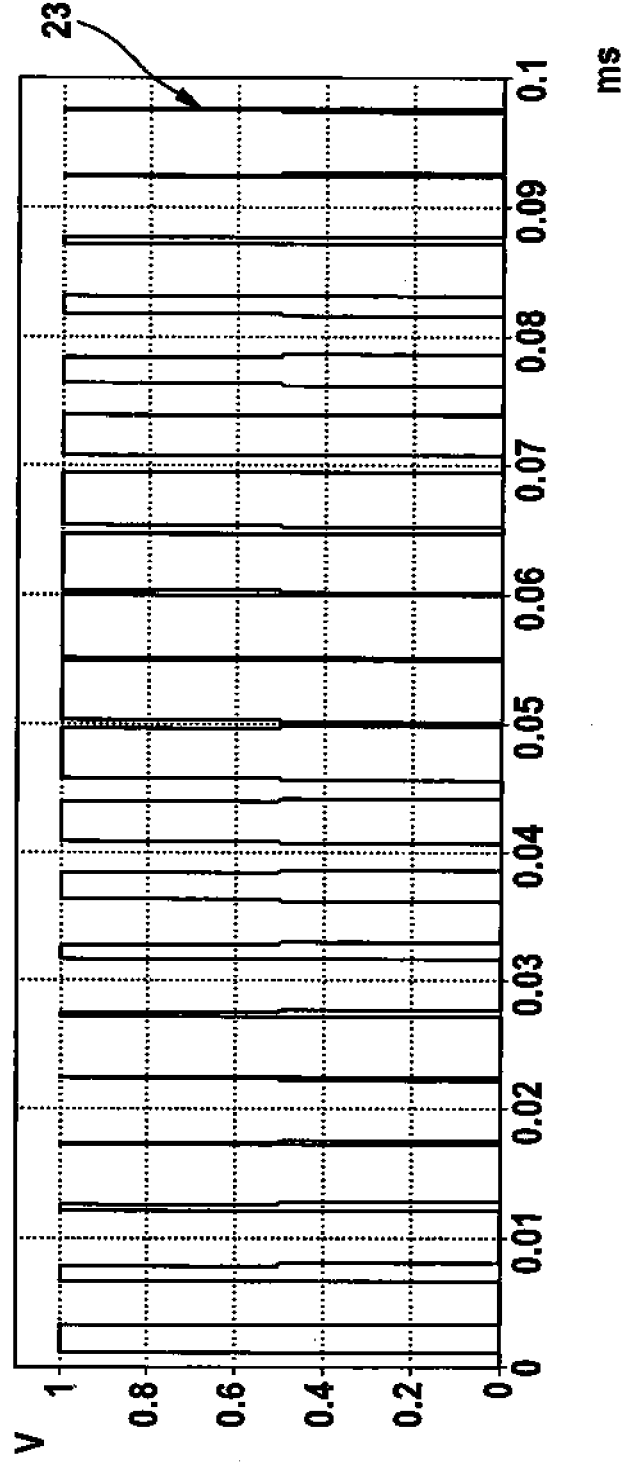

FIG. 2 shows a triangle-sine modulation method, as is typically used to generate such an activation signal according to the related art. In each of partial diagrams A and B of FIG. 2, a voltage in volts is plotted on the ordinate in relation to a time in milliseconds on the abscissa. A predefined setpoint voltage 21 is superimposed for this purpose with a triangle signal 22, which has a significantly higher frequency than setpoint voltage 21, typically 10 kHz or more.

An activation signal 23 shown in partial Figure B is generated in that when triangle signal 22 is greater than setpoint voltage signal 21, the value "one" is used for activation signal 23, otherwise the value "zero" is used. For example, in each case a switching element 14 of one half-bridge 13 of an electric machine 10 according to FIG. 1 is activated using this activation signal 23. The activation signals for other switching elements 14 in the same rectifier branch, for example, the high side MOSFETs, result due to a corresponding phase shift of activation signal 23. The activation of switching elements 14 in the respective other rectifier branch takes place inversely thereto, optionally at a time interval, to avoid "hot paths."

Figure 3:
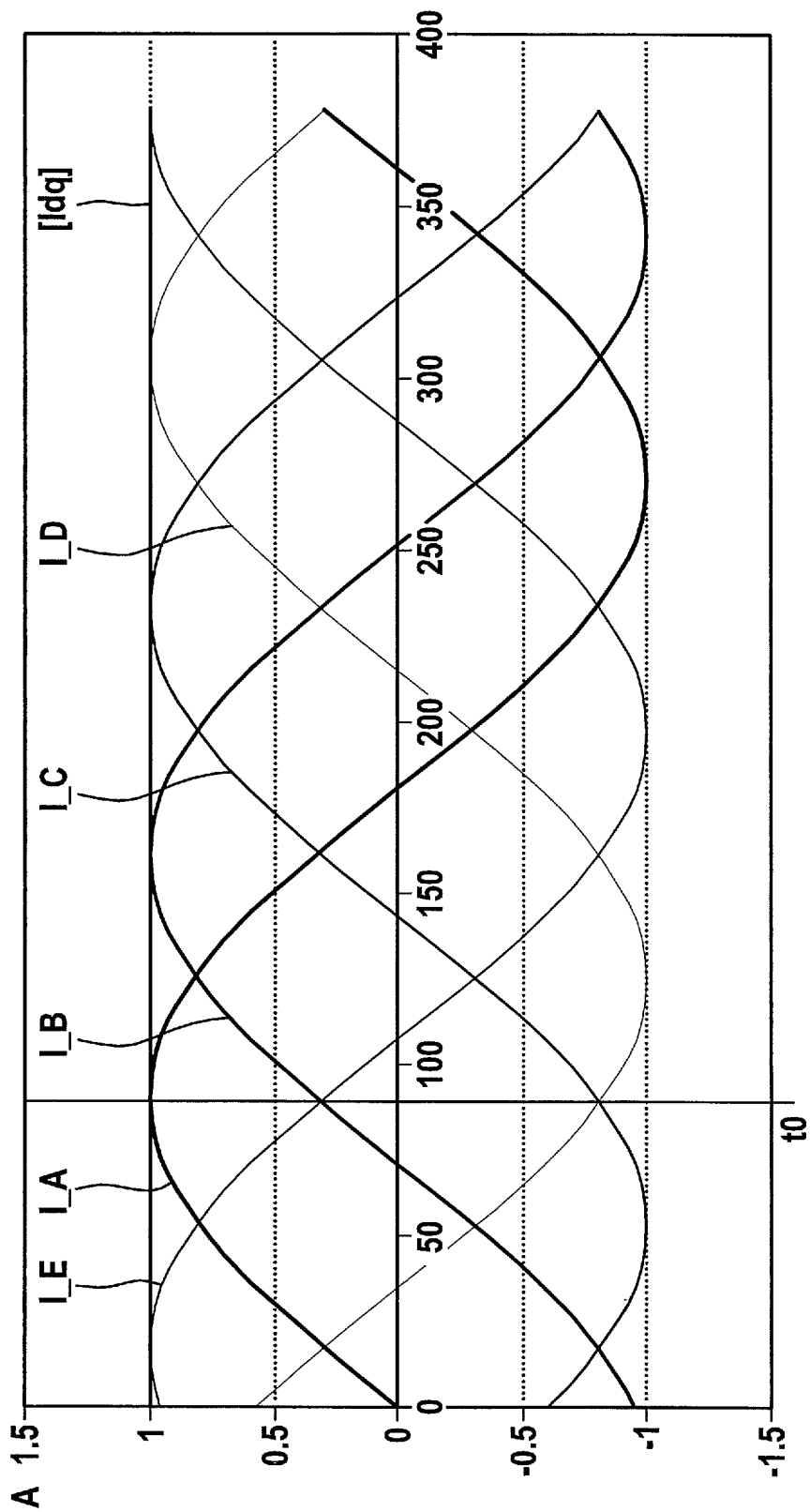
FIG. 3 illustrates phase currents in a rotating electric machine according to the related art.

FIG. 3 shows phase currents I_A through I_E, which are generated with rotating machine and sinusoidal phase voltage specification in A over a phase angle of 0° to 400°. As a function of the rotational speed, these phase angles correspond to variable times, a point in time t0 being specified here as a reference. In the case of symmetrical distribution, individual phase currents I_A through I_E may be combined to form a space vector |Idq|. The Clark and Park transformations known from the literature are used for this purpose:

$$I_\alpha = \frac{2}{5}\left(I_A + I_B \cdot \cos\left(\frac{2\pi}{5}\right) + I_C \cdot \cos\left(\frac{4\pi}{5}\right) + I_D \cdot \cos\left(\frac{6\pi}{5}\right) + I_E \cdot \cos\left(\frac{8\pi}{5}\right)\right)$$

$$I_\beta = \frac{2}{5}\left(I_B \cdot \sin\left(\frac{2\pi}{5}\right) + I_C \cdot \sin\left(\frac{4\pi}{5}\right) + I_D \cdot \sin\left(\frac{6\pi}{5}\right) + I_E \cdot \sin\left(\frac{8\pi}{5}\right)\right)$$

$$I_d = I_\alpha \cdot \cos\varphi + I_\beta \cdot \sin\varphi$$

$$I_q = -I_\alpha \cdot \sin\varphi + I_\beta \cdot \cos\varphi$$

The torque which may be generated is proportional in a first approximation to the q component of the Idq space vector. As shown in FIG. 3, the length of this space vector corresponds to the amplitude of the sinusoidal phase currents. The effective value is decisive for the thermal load of the machine. In the case of a rotating machine and sinusoidal phase currents, effective value $I_{Eff}$ is calculated from the amplitude of particular phase current $A(I_{Phase})$ $I_{Phase}$ alternately standing for one of currents I_A through I_E:

$$I_{Eff} = A(I_{Phase})/\sqrt{2}$$

Figure 4:
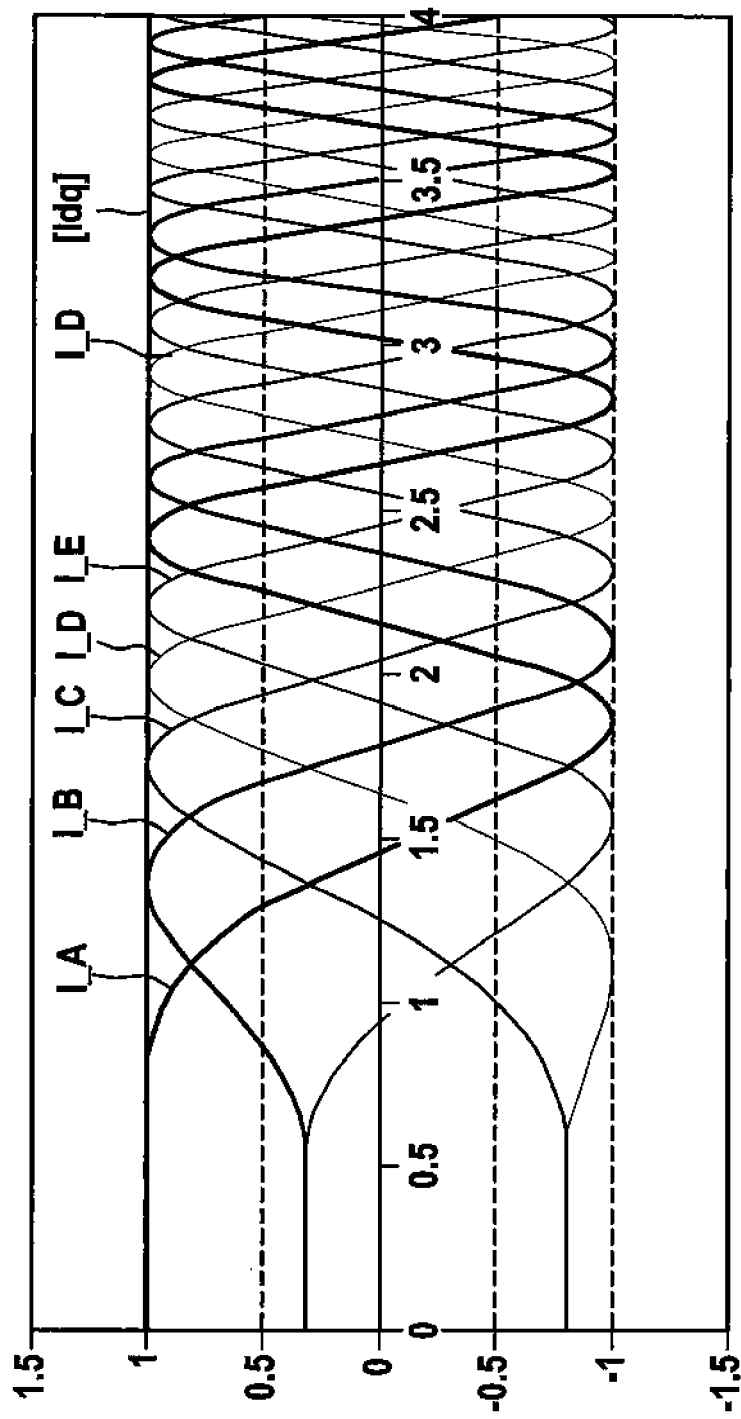
FIG. 4 illustrates phase currents in a starting electric machine according to the related art.

FIG. 4 shows current curves I_A through I_E in A over a time in seconds for a scenario in which the electric machine is initially stationary and only thereafter begins to rotate (after approximately 0.5 seconds). Between 0 and 0.5 seconds (i.e., during the standstill), direct currents of different levels flow in phases A through E, the levels resulting from the instantaneous angular position of the machine (these stationary currents correspond at the same time to a snapshot of the current curves according to FIG. 3 at point in time t0). The least favorable case for phase A is shown in FIG. 4, since the maximum phase current is continuously applied here.

To arrive again at the same (mean) thermal load as in the case of a rotating machine, the phase current amplitude has to be reduced by the factor $1/\sqrt{2}$, which also results in a corresponding reduction of the starting torque, however.

FIG. 4 also shows that in remaining phases B through E, significantly lower currents flow than in phase A. The basic idea of the present invention is to achieve more uniform current distribution by suitable activation, and at the same time to produce a current space vector of preferably great length.

In the ideal case, all currents would be of equal size in this case. However, in the present five-phase machine, this phase is not to be achieved because of the odd phase number, since current always flows into the machine either through two phases and back out through three phases or vice versa.

An activation comes closest to this ideal case in which an equivalent positive phase current flows in two phases, an equivalent negative phase current flows in two further phases, and the current zero flows in the fifth phase.

Figure 5:
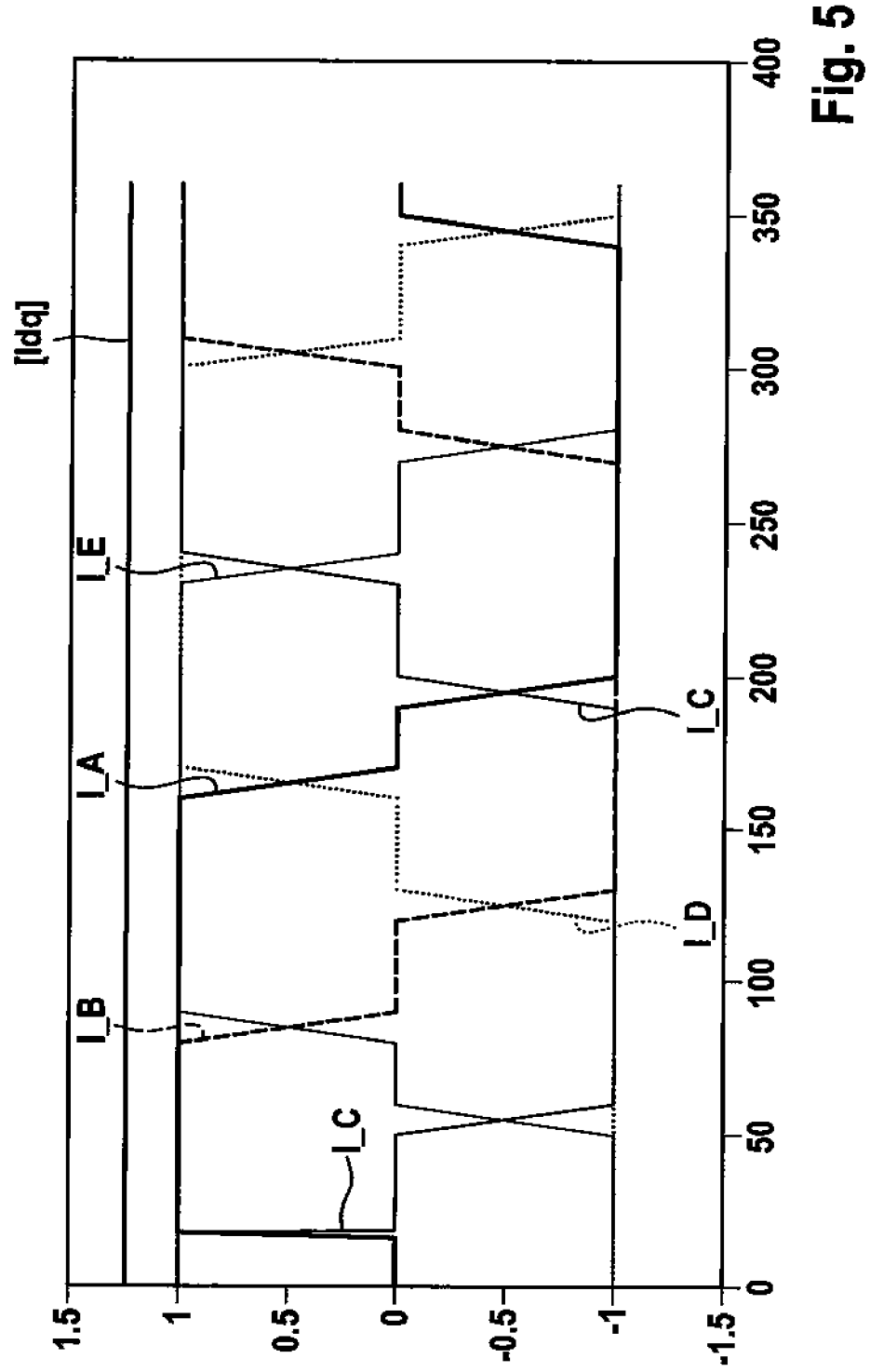
FIG. 5 illustrates phase currents in a starting electric machine according to one specific embodiment of the present invention.

Such an activation is shown in FIG. 5. If the associated current space vector Idq is calculated according to the above-specified transformation guidelines, it results that its absolute value |Idq| is greater by the factor 1.23 than the maximum occurring phase current (in relation to a factor 1 in the case of the conventional activation).

Figure 6:
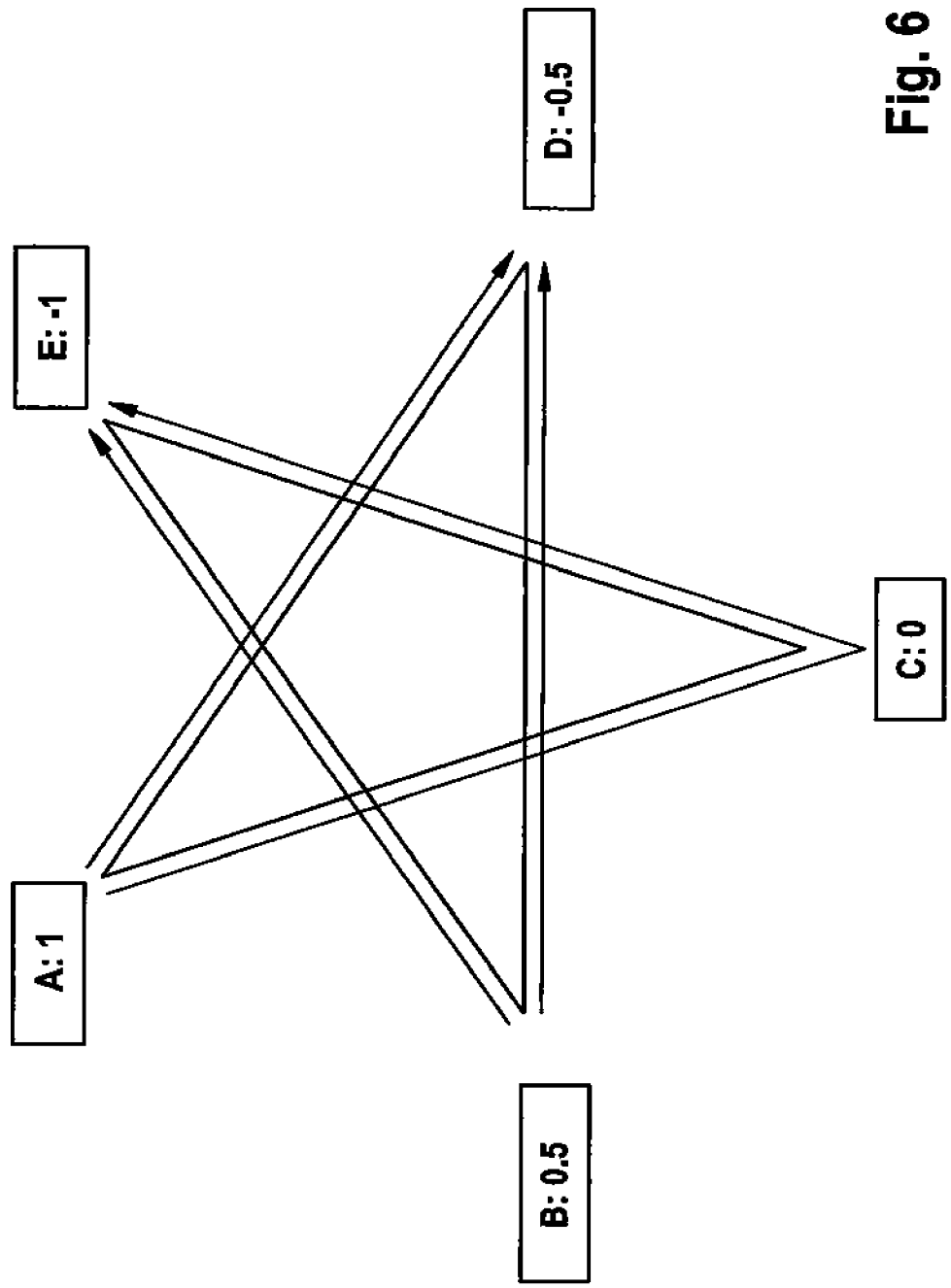
FIG. 6 illustrates phase voltages in an electric machine operated according to one specific embodiment of the present invention.

FIG. 6 shows the phase voltages which must be applied to the phases for generating such a current curve. For the case in consideration, the current in phase C is to go to zero; correspondingly the voltage zero is applied to this phase. Phases A and B are switched to positive; phases D and E are switched to negative.

From phase A, a current flow results to phase D and to phase E, whereby the latter runs via two coils (A-C-E), so that twice as large an ohmic resistance is present between A and E as between A and D. From phase B, current flows also result to phases D and E, which each run only via one coil, however.

In order to obtain equivalent phase currents in spite of this asymmetrical resistance distribution, the voltages at phases B and D must be selected to be half as large as those at phases A and E, as the following calculation shows:

$$I_A = \frac{U_{AE}}{2R} + \frac{U_{AD}}{R} = \frac{2}{2R} + \frac{1.5}{R} = \frac{2.5}{R}$$

$$I_B = \frac{U_{BD}}{R} + \frac{U_{BE}}{R} = \frac{1}{R} + \frac{1.5}{R} = \frac{2.5}{R}$$

$$I_C = 0$$

$$I_D = \frac{U_{DB}}{R} + \frac{U_{DA}}{R} = \frac{-1}{R} + \frac{-1.5}{R} = -\frac{2.5}{R}$$

$$I_E = \frac{U_{EA}}{R} + \frac{U_{EB}}{2R} = \frac{-2}{R} + \frac{-1.5}{2R} = -\frac{2.5}{R}$$

Depending on the angle position of the stationary machine, this activation pattern must be rotated accordingly. The required activation vectors over one electrical revolution are shown in FIG. 7, Phi in the table of FIG. 7 corresponding to the phase angles and the relative voltage specifications being specified in columns A through E.

It is understood that here and above in each case the illustrated voltage specifications −1, −0.5, 0.5, and 1 do not have to correspond to −1, −0.5, 0.5, and 1 V, but rather also may represent relative specifications with respect to a voltage used in each case. A specification of −1 may correspond, for example, to −48, −36, −24, or −12 V or any other permissible voltage value. Correspondingly, a value of 1 may correspond, for example, to 48, 36, 24, or 12 V. The values −0.5 and 0.5 are each half thereof. The absolute level of the voltage specifications is selected in this case in such a way that at a value of 1, the maximum permissible current is not exceeded, and is set as in the conventional activation by a higher-order field-oriented regulation.

Figure 7:
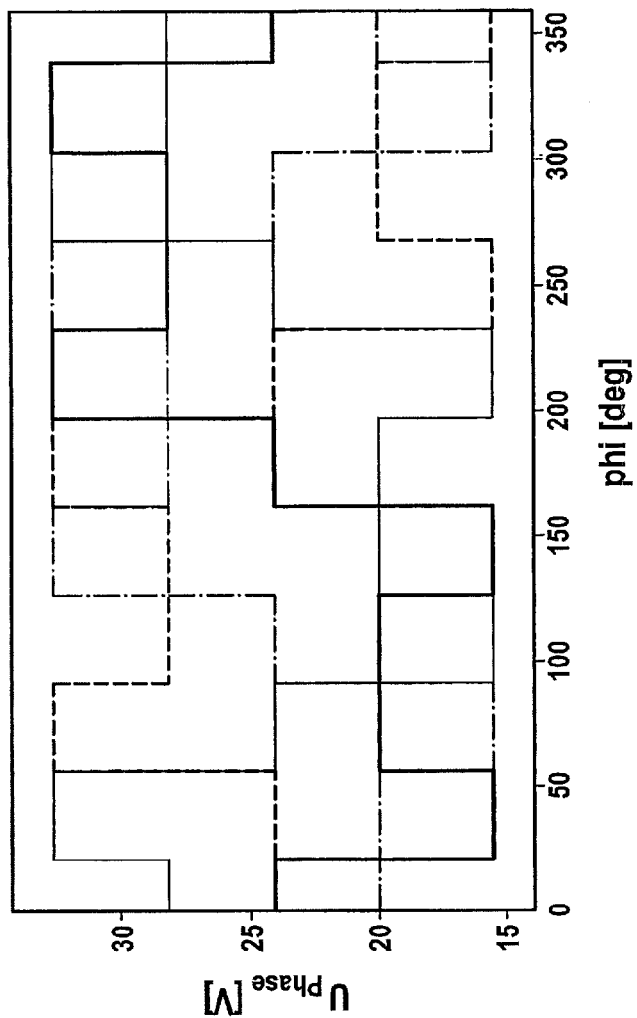
FIG. 7 illustrates an activation method according to one specific embodiment of the present invention for a stationary electric machine.
Figure 8:
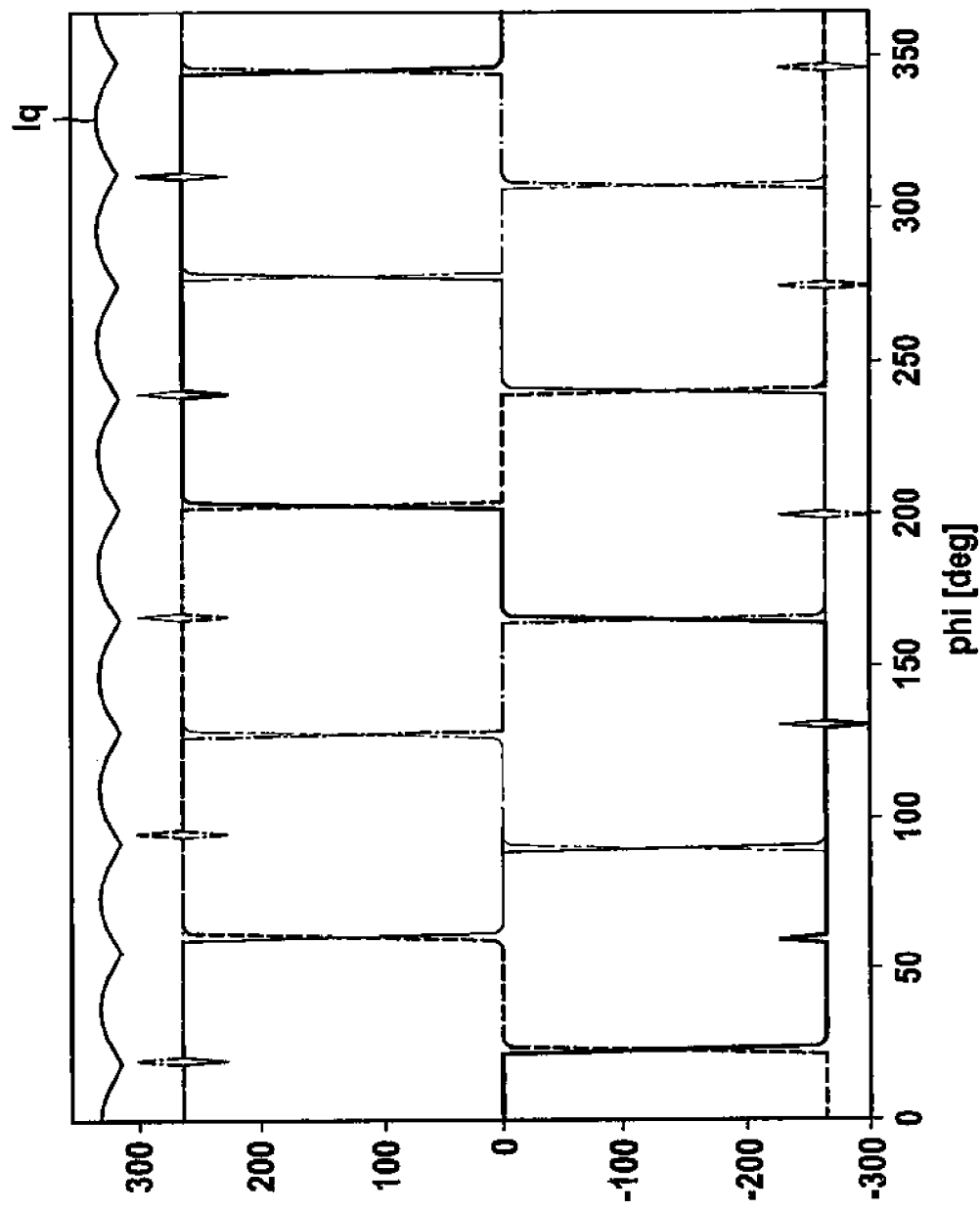
FIG. 8 illustrates a phase current curve in a slowly rotating electric machine during activation according to FIG. 7.

FIG. 8 shows the phase current curve over one electrical revolution when the machine is rotated slowly upon use of the activation pattern illustrated in FIG. 7. It is apparent that this activation pattern is less suitable for a rotating machine, since every time a phase current is turned off, current peaks result in the adjacent phases. Furthermore, it is apparent that the q component of the space vector is not constant over one electrical revolution, but rather is subject to harmonic waves, which would result in an increased torque ripple in relation to the conventional activation.

The present invention therefore provides for using the explained activation method (cf. FIG. 7) only at a standstill and switching over to a conventional sinusoidal voltage specification (cf. FIG. 3), for example, as soon as the machine begins to rotate at a specific minimum speed or, in other words, as soon as a limiting speed is exceeded.

Figure 9:
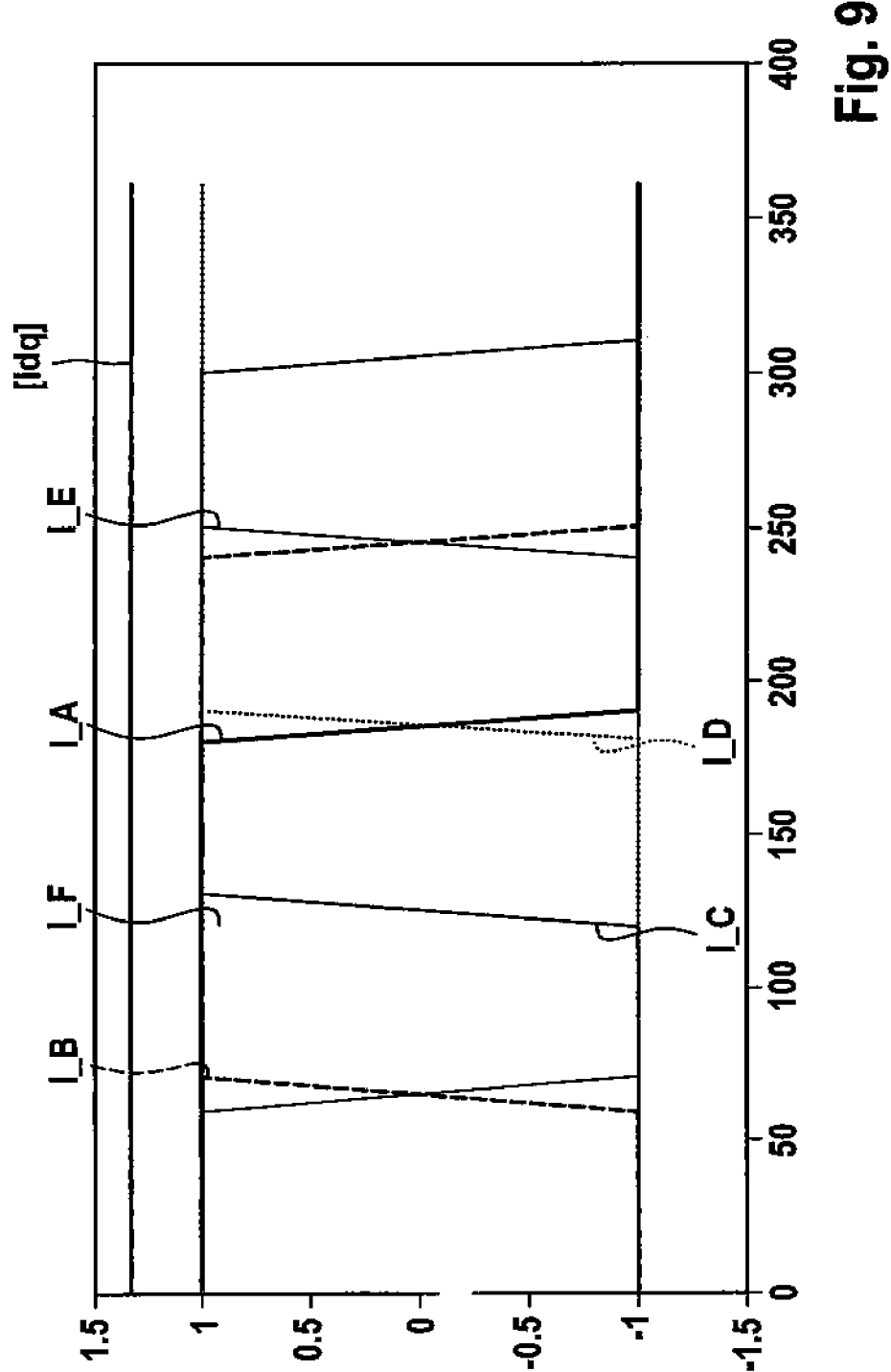
FIG. 9 illustrates phase currents in a starting electric machine according to one specific embodiment of the present invention.

The universal usability of the present invention is illustrated on the basis of FIG. 9, in which the activation of a six-phase electric machine is shown. In the case of a sinusoidal commutation according to FIG. 2, a picture similar to FIG. 3 would result (but with an additional phase and a correspondingly adapted offset). A current space vector Idq also results here, whose length corresponds to the amplitude of the phase currents.

In contrast, if an activation is carried out according to FIG. 9 (similar to FIG. 5, but with an additional phase current I_F), a current space vector results, the absolute value of which is greater by the factor 1.33 than the amplitude of the phase currents. To derive the phase currents or generate them, those skilled in the art will apply the above-explained rules in dependence on the particular specific embodiment of the electric machine.

What is claimed is:

1. A method for activating an electric machine, which is operable at least as a motor and includes a rotor, a stator winding having a number of phases and a rectifier having a number of half-bridges corresponding to the number of phases, which each have active switching elements situated in a series connection between two DC voltage terminals of the rectifier, between which the phases are connected, the method comprising:
    applying alternating current signals, which are phase-offset to one another by switching the switching elements, to the respective phases in a first motor operating mode in which the rotor rotates above a predefined limiting speed, the frequency of the signals being speed-dependently set; and
    at least partially applying constant direct-current signals to the respective phases in a second motor operating mode in which the rotor is one of stationary or rotates below the limiting speed, by switching the switching elements as a function of an instantaneous angle position of the rotor, the direct-current signals being selected in such a way that a current flow does not exceed a predefined maximum current absolute value through any of the phases and an absolute value of a space vector in a d/q coordinate system, which is defined on the basis of the current flows through the phases, is greater than the maximum current absolute value;
    wherein the electric machine has five phases and the rectifier has five half-bridges, whose switching elements are switched in the second operating mode in such a way that a positive voltage signal having a first absolute value is output via a first of the half-bridges, a negative voltage signal having the first absolute value is output via a second of the half-bridges, a positive voltage signal having half of the first absolute value is output via a third of the half-bridges, a negative voltage signal having half of the first absolute value is output via a fourth of the half-bridges, and no voltage signal is output to the phases via a fifth of the half-bridges.

2. The method as recited in claim 1, wherein the voltage signals are output at star points of the stator winding having five phases connected to one another in a star circuit.

3. The method as recited in claim 1, wherein the electric machine has four to six phases and the rectifier has corresponding four to six half-bridges.

4. The method as recited in claim 1, wherein the absolute value of the space vector in the d/q coordinate system is determined by a Clarke and Park transformation.

5. The method as recited in claim 1, wherein the maximum current absolute value is ascertained with the aid of a field-oriented regulation.

6. The method as recited in claim 1, wherein, in the first operating mode, the alternating current signals are applied to the phases in each case by switching the switching elements on the basis of triangle-sine modulation.

7. An electric machine, which is operable at least as a motor, comprising:
   a rotor;
   a stator winding having multiple phases;
   a rectifier having multiple half-bridges corresponding to the number of phases, which each have active switching elements situated in a series connection between two DC voltage terminals of the rectifier, between which the phases are connected; and
   a control unit including a processor configured to:
   apply alternating current signals, which are phase-offset to one another by switching the switching elements, to the respective phases in a first motor operating mode in which the rotor rotates above a predefined limiting speed, the frequency of the signals being speed-dependently set;
   at least partially apply constant direct-current signals to the respective phases in a second motor operating mode in which the rotor is one of stationary or rotates below the limiting speed, by switching the switching elements as a function of an instantaneous angle position of the rotor, the direct-current signals being selected in such a way that a current flow does not exceed a predefined maximum current absolute value through any of the phases and an absolute value of a space vector in a d/q coordinate system, which is defined on the basis of the current flows through the phases, is greater than the maximum current absolute value;
   wherein the electric machine has five phases and the rectifier has five half-bridges, whose switching elements are switched in the second operating mode in such a way that a positive voltage signal having a first absolute value is output via a first of the half-bridges, a negative voltage signal having the first absolute value is output via a second of the half-bridges, a positive voltage signal having half of the first absolute value is output via a third of the half-bridges, a negative voltage signal having half of the first absolute value is output via a fourth of the half-bridges, and no voltage signal is output to the phases via a fifth of the half-bridges.

8. The electric machine as recited in claim 7, wherein the voltage signals are output at star points of the stator winding having five phases connected to one another in a star circuit.

9. The electric machine as recited in claim 7, wherein the electric machine has four to six phases and the rectifier has corresponding four to six half-bridges.

10. The electric machine as recited in claim 7, wherein the absolute value of the space vector in the d/q coordinate system is determined by a Clarke and Park transformation.

11. The electric machine as recited in claim 7, wherein the maximum current absolute value is ascertained with the aid of a field-oriented regulation.

12. The electric machine as recited in claim 7, wherein, in the first operating mode, the alternating current signals are applied to the phases in each case by switching the switching elements on the basis of triangle-sine modulation.

13. A non-transitory, computer-readable data storage medium storing a computer program, which is executable by a processor, comprising:
   a program code having program code for activating an electric machine, which is operable at least as a motor and includes a rotor, a stator winding having a number of phases and a rectifier having a number of half-bridges corresponding to the number of phases, which each have active switching elements situated in a series connection between two DC voltage terminals of the rectifier, between which the phases are connected, by performing the following:
   applying alternating current signals, which are phase-offset to one another by switching the switching elements, to the respective phases in a first motor operating mode in which the rotor rotates above a predefined limiting speed, the frequency of the signals being speed-dependently set; and
   at least partially applying constant direct-current signals to the respective phases in a second motor operating mode in which the rotor is one of stationary or rotates below the limiting speed, by switching the switching elements as a function of an instantaneous angle position of the rotor, the direct-current signals being selected in such a way that a current flow does not exceed a predefined maximum current absolute value through any of the phases and an absolute value of a space vector in a d/q coordinate system, which is defined on the basis of the current flows through the phases, is greater than the maximum current absolute value;
   wherein the electric machine has five phases and the rectifier has five half-bridges, whose switching elements are switched in the second operating mode in such a way that a positive voltage signal having a first absolute value is output via a first of the half-bridges, a negative voltage signal having the first absolute value is output via a second of the half-bridges, a positive voltage signal having half of the first absolute value is output via a third of the half-bridges, a negative voltage signal having half of the first absolute value is output via a fourth of the half-bridges, and no voltage signal is output to the phases via a fifth of the half-bridges.

14. The data storage medium as recited in claim 13, wherein the voltage signals are output at star points of the stator winding having five phases connected to one another in a star circuit.

15. The data storage medium as recited in claim 13, wherein the electric machine has four to six phases and the rectifier has corresponding four to six half-bridges.

16. The data storage medium as recited in claim 13, wherein the absolute value of the space vector in the d/q coordinate system is determined by a Clarke and Park transformation.

17. The data storage medium as recited in claim 13, wherein the maximum current absolute value is ascertained with the aid of a field-oriented regulation.

18. The data storage medium as recited in claim 13, wherein, in the first operating mode, the alternating current signals are applied to the phases in each case by switching the switching elements on the basis of triangle-sine modulation.

\* \* \* \* \*